United States Patent
Ogawa et al.

(10) Patent No.: US 9,163,167 B2
(45) Date of Patent: Oct. 20, 2015

(54) ADHESIVE COMPOSITION AND OPTICAL MEMBER USING THE SAME

(75) Inventors: Hiroshi Ogawa, Kanagawa (JP); Tatsuhiro Suwa, Kanagawa (JP); Cheong Hun Song, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 36 days.

(21) Appl. No.: 13/155,932

(22) Filed: Jun. 8, 2011

(65) Prior Publication Data

US 2012/0316294 A1 Dec. 13, 2012

(51) Int. Cl.
*B32B 27/12* (2006.01)
*C09J 133/00* (2006.01)
*C08K 5/37* (2006.01)
*C09J 133/08* (2006.01)
*C08K 5/29* (2006.01)
*C08K 5/5435* (2006.01)

(52) U.S. Cl.
CPC ........... *C09J 133/08* (2013.01); *C08K 5/29* (2013.01); *C08K 5/5435* (2013.01)

(58) Field of Classification Search
None
See application file for complete search history.

(56) References Cited

U.S. PATENT DOCUMENTS

| 7,923,503 | B2 * | 4/2011 | Takahashi et al. ............. 524/460 |
| 2008/0138617 | A1 * | 6/2008 | Takahashi et al. ............. 428/343 |
| 2009/0099298 | A1 * | 4/2009 | Yukawa ........................ 524/506 |
| 2009/0208741 | A1 * | 8/2009 | Toyama et al. ......... 428/355 AC |
| 2010/0028671 | A1 * | 2/2010 | Mitsui et al. .................. 428/354 |
| 2010/0330354 | A1 * | 12/2010 | Tsukagoshi et al. .......... 428/220 |
| 2011/0045289 | A1 | 2/2011 | Toyama et al. |
| 2012/0059127 | A1 * | 3/2012 | Ha et al. ..................... 525/327.2 |

FOREIGN PATENT DOCUMENTS

| CN | 101508875 A | 8/2009 |
| CN | 101775258 A | 7/2010 |
| CN | 102051146 A | 5/2011 |
| JP | 11-293222 | 10/1999 |
| JP | 11293222 A | 10/1999 |
| JP | 2003-049141 | 2/2003 |
| JP | 2004-224873 | 8/2004 |
| TW | 200944567 A | 11/2009 |

OTHER PUBLICATIONS

Chinese Office Action dated Nov. 8, 2013.
Office Action Dated Jul. 24, 2014 in corresponding Chinese Patent Application No. 201110163170.8.

* cited by examiner

*Primary Examiner* — Ana Woodward
(74) *Attorney, Agent, or Firm* — Lee & Morse, P.C.

(57) ABSTRACT

An adhesive composition includes 100 parts by weight of a (meth)acrylate copolymer having a weight average molecular weight of 1,000,000 to 2,000,000 g/mol; and 0.05 to 5 parts by weight of a carbodiimide cross-linking agent.

12 Claims, 2 Drawing Sheets

Fig 1

TABLE 2

| Composition of polymer (A) | | 1 | 2 | 3 | 4 | 5 | 6 | 7 | 8 | Preparation Example 9 | 10 | 11 | 12 | 13 | 14 | 15 | 16 | 17 | 18 |
|---|---|---|---|---|---|---|---|---|---|---|---|---|---|---|---|---|---|---|---|
| Sample | | A-1 | A-2 | A-3 | A-4 | A-5 | A-6 | A-7 | A-8 | A-9 | A-10 | A-11 | A-12 | A-13 | A-14 | A-15 | A-16 | A-17 | A-18 |
| Monomer (parts by weight) | BA | 99 | 89.9 | 99.2 | 98.2 | 98 | 95.8 | 87 | 88 | 83.7 | 93.3 | 99 | 89.7 | 90 | 90 | 80 | 80 | 51 | 51 |
| | 2EHA | | 10 | | | | 3 | 4 | 7 | 15 | 5 | | 9 | 4 | 7 | 14.3 | 16.8 | 46 | 46 |
| | HEA | 1 | | | | | 0.2 | | | | | | | | | 5 | 2.5 | 0.1 | |
| | 4HBA | | 0.1 | | 1.8 | | | | | | | | | | | | | | |
| | HEAA | | | 0.8 | | | | | | 1 | 1 | 1 | 1 | | 3 | | | 2.9 | 3 |
| | AA | | | | | 2 | 1 | 9 | 5 | 0.3 | 0.7 | | 0.3 | 6 | | 0.7 | 0.7 | | |
| Total (parts by weight) | | 100 | 100 | 100 | 100 | 100 | 100 | 100 | 100 | 100 | 100 | 100 | 100 | 100 | 100 | 100 | 100 | 100 | 100 |
| Viscosity (mPa·s) | | 4500 | 4000 | 4500 | 4000 | 4500 | 4000 | 3000 | 2500 | 2500 | 3500 | 5000 | 2500 | 2000 | 2500 | 2000 | 1500 | 500 | 500 |
| Solid content (%) | | 20 | 20 | 20 | 20 | 20 | 20 | 20 | 20 | 20 | 20 | 20 | 20 | 20 | 20 | 20 | 20 | 20 | 20 |
| Weight average molecular weight of polymer A* | | 1.6 | 1.5 | 1.6 | 1.4 | 1.6 | 1.4 | 1.2 | 1.1 | 1.1 | 1.4 | 1.8 | 1.2 | 1.1 | 1.2 | 1.1 | 1 | 0.7 | 0.7 |

Notes: * units are in millions, i.e., 1.6 means a weight average molecular weight of 1.6 million "BA," "2EHA," "HEA," "4HBA," "HEAA," and "AA" refer to butyl acrylate, 2-ethylhexyl acrylate, 2-hydroxyethyl acrylate, 4-hydroxybutyl acrylate, N-2-hydroxyethyl acrylamide, and acrylic acid, respectively.

Fig 2

TABLE 4

| Composition (parts by weight) | | Example | | | | | | | | | | Comparative Example | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 | 7 | 8 |
| | | A-1 | A-2 | A-3 | A-4 | A-5 | A-6 | A-7 | A-8 | A-9 | A-10 | A-11 | A-12 | A-13 | A-14 | A-15 | A-16 | A-17 | A-18 |
| Polymer (A) | | 100 | 100 | 100 | 100 | 100 | 100 | 100 | 100 | 100 | 100 | 100 | 100 | 100 | 100 | 100 | 100 | 100 | 100 |
| Carbodiimide cross-linker (B) | B-1 | 1 | 0.05 | | 4 | | | 5 | 1 | 3 | | | | 7.0 | | | | | |
| | B-2 | | | 0.1 | | 0.1 | | | | | | | | | | 2.5 | | 0.45 | |
| | B-3 | | | | | | 0.2 | | | | 0.3 | | | | 0.01 | | 0.3 | | 0.15 |
| Isocyanate cross-linker (C) | C-1 | 0.1 | 1 | | | 0.2 | 0.15 | | 0.5 | | 4 | 0.5 | | 0.3 | 0.4 | | | | |
| Other cross-linkers D-1 | | | | | | | | | | | | | 0.2 | | | | | | |
| Silane coupling agent | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Gel content (%) | | 77 | 80 | 85 | 91 | 89 | 84 | 94 | 88 | 82 | 93 | 90 | 78 | 92 | 77 | - | 82 | 78 | 70 |
| Properties | Metal corrosion control and prevention | ○ | ○ | ○ | ○ | ○ | ○ | ○ | ○ | ○ | ○ | ○ | ○ | ○ | ○ | - | ○ | ○ | ○ |
| | Light leakage resistance | △ | △ | △ | ○ | △ | △ | ○ | △ | ○ | △ | ○ | ○ | ○ | ○ | - | ○ | ○ | ○ |
| | Durability | ○ | ○ | ○ | ○ | ○ | ○ | ○ | ○ | ○ | ○ | × | × | × | ○ | - | × | × | × |
| | Adhesion (N/25mm) | 4 | 5 | 4 | 6 | 7 | 6 | 8 | 6 | 7 | 7 | 3 | 5 | 3 | 5 | - | 4 | 8 | 9 |
| | Adhesiveness to substrate | ○ | ○ | ○ | ○ | ○ | ○ | ○ | ○ | ○ | ○ | ○ | ○ | ○ | ○ | - | ○ | ○ | ○ |
| | Adherend contamination resistance | ○ | ○ | ○ | ○ | ○ | ○ | ○ | ○ | ○ | ○ | ○ | ○ | ○ | ○ | - | ○ | ○ | ○ |
| | Low-temperature stability | ○ | ○ | ○ | ○ | ○ | ○ | ○ | ○ | ○ | ○ | ○ | ○ | ○ | ○ | - | ○ | ○ | ○ |
| | Reworkability | ○ | ○ | ○ | ○ | ○ | ○ | ○ | ○ | ○ | ○ | ○ | ○ | ○ | ○ | - | ○ | ○ | ○ |

ADHESIVE COMPOSITION AND OPTICAL MEMBER USING THE SAME

BACKGROUND

1. Field

Embodiments relate to an adhesive composition and an optical member using the same.

2. Description of the Related Art

Recently, flat panel displays (FPDs), such as LCDs, PDPs, and organic EL devices, are increasingly used. Such displays may have optical members applied thereto using an adhesive.

SUMMARY

An embodiment is directed to an adhesive composition, including 100 parts by weight of a (meth)acrylate copolymer having a weight average molecular weight of 1,000,000 to 2,000,000 g/mol; and 0.05 to 5 parts by weight of a carbodiimide cross-linking agent.

The adhesive composition may further include 0.05 to 5 parts by weight of an isocyanate cross-linking agent.

The (meth)acrylate copolymer may include 0 to 9 parts by weight of a carboxyl group containing monomer, 0 to 1.8 parts by weight of a hydroxyl group containing (meth)acrylic monomer, and 89.2 to 99.9 parts by weight of a (meth)acrylic acid ester monomer. The total amount of the carboxyl group containing monomer and the hydroxyl group containing (meth)acrylic monomer may be greater than 0 parts by weight.

The (meth)acrylate copolymer may further include at least one of an epoxy group containing acrylic monomer, an amino group containing acrylic monomer, a phosphate group containing acrylic monomer, a sulfonic acid group containing acrylic monomer, a urethane group containing acrylic monomer, a phenyl group containing acrylic vinyl monomer, a silane group containing vinyl monomer, styrene, chlorostyrene, α-methylstyrene, vinyltoluene, vinyl chloride, vinyl acetate, vinyl propionate, acrylonitrile, and vinyl pyridine.

The adhesive composition may further include a silane coupling agent.

The adhesive composition may have a viscosity of 500 to 5,000 mPa·s at 25° C.

Another embodiment is directed to an optical member comprising an adhesive layer formed of the adhesive composition according to an embodiment.

BRIEF DESCRIPTION OF THE DRAWINGS

The above and other features and advantages will become more apparent to those of skill in the art by describing in detail example embodiments with reference to the attached drawings, in which:

FIG. 1 illustrates Table 2 listing components used to form the polymer (A) of Synthesis Examples 1-18; and FIG. 2 illustrates Table 4 listing components used in the adhesive compositions of Examples 1 to 10 and Comparative Examples 1 to 8, as well as performance test results.

DETAILED DESCRIPTION

Japanese Patent Application No. 2009-280732, filed on Dec. 10, 2009, in the Japan Patent Office, and entitled: "Adhesive Composition and Optical Member using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

An embodiment provides an adhesive composition that may be used as a pressure-sensitive adhesive, e.g., for attaching an optical member such as a polarizer plate to a display such as an LCD. The adhesive composition according to an embodiment may include 100 parts by weight of a (meth)acrylate copolymer including 0 to 9 parts by weight of a carboxyl group containing monomer, 0 to 1.8 parts by weight of a hydroxyl group containing (meth)acrylic monomer, and 89.2 to 99.9 parts by weight of a (meth)acrylic acid ester monomer. The total amount of the carboxyl group containing monomer and the hydroxyl group containing (meth)acrylic monomer may be greater than 0 parts by weight. The (meth)acrylic copolymer may have a weight average molecular weight of 1,000,000 to 2,000,000 g/mol. The adhesive composition according to an embodiment may further include 0.05 to 5 parts by weight of a carbodiimide cross-linking agent.

In an embodiment, the hydroxyl group containing (meth)acrylic monomer may be present in an amount of 1.8 wt % or less, based on the total amount of the monomers of the (meth)acrylate copolymer. As the amount of the hydroxyl group containing (meth)acrylic monomer is controlled, an adhesive layer formed from the adhesive composition may provide sufficient flexibility to accommodate contraction of a polarizer plate over time, and accordingly the adhesive layer may provide for excellent light leakage resistance and durability.

In the present example embodiment, a carbodiimide cross-linking agent is used as a cross-linking agent. Accordingly, the (meth)acrylate copolymer may be cross-linked into a straight chain at a suitable cross-linking ratio, the adhesive layer may provide a cross-linking structure having sufficient flexibility and durability to accommodate contraction of a polarizer plate over time, and the adhesive layer may provide for excellent light leakage resistance.

The adhesive layer formed of the adhesive composition according to the present example embodiment may provide for excellent light leakage resistance for an optical member. In addition, due to excellent durability, the adhesive layer may resist against being stripped or separated from an adherend by heat or humidity.

Hereinafter, components of the adhesive composition according to the present example embodiment will be described in detail. Herein, a "(meth)" compound will collectively refer to both a compound and a meth-containing compound. For example, "(meth)acrylate" includes both acrylate and methacrylate, and "(meth)acrylic acid" includes both acrylic acid and methacrylic acid.

(A) (Meth)Acrylate Copolymer

In the present example embodiment, the (meth)acrylate copolymer (hereinafter, also referred to as "component (A)") includes 0 to 9 parts by weight of a carboxyl group containing monomer (hereinafter, also referred to as "component (a-1)"), 0 to 1.8 parts by weight of a hydroxyl group containing (meth)acrylic monomer (hereinafter, also referred to as "component (a-2)"), and 89.2 to 99.9 parts by weight of a (meth)acrylic acid ester monomer (hereinafter, also referred to as "component (a-3)"). The total amount of the carboxyl group containing monomer and the hydroxyl group containing (meth)acrylic monomer may be greater than 0 parts by weight, i.e., at least one of a-1 and a-2 may be used when forming the copolymer. The (meth)acrylate copolymer may have a weight average molecular weight of 1,000,000 to 2,000,000 g/mol.

(a-1) Carboxyl Group Containing Monomer

In the present example embodiment, the carboxyl group containing monomer is an unsaturated monomer having at least one carboxyl group. The carboxyl group containing monomer may include, e.g., (meth)acrylic acid, maleic acid, maleic anhydride, fumaric acid, fumaric anhydride, crotonic acid, itaconic acid, itaconic anhydride, myristic acid, palmitic acid, and oleic acid, which may be used alone or as mixtures. Among these monomers, (meth)acrylic acid, maleic acid, maleic anhydride, fumaric acid, fumaric anhydride, crotonic acid, itaconic acid, and itaconic anhydride are preferable; and (meth)acrylic acid is more preferable.

In the present example embodiment, the carboxyl group containing monomer may be present in an amount of 0 to 9 parts by weight, preferably 0.1 to 8 parts by weight, and more preferably 0.2 to 5 parts by weight. Maintaining the amount at or below 9 parts by weight helps ensure that an undue number of carboxyl groups are not present in the copolymer A, which could result in too many crosslink points to be formed by reaction of these carboxyl groups and the carbodiimide cross-linking agent (B), thus resulting in the adhesive composition having reduced flexibility and reduced light leakage resistance.

(a-2) Hydroxyl Group Containing (Meth)Acrylic Monomer

In the present example embodiment, the hydroxyl group containing (meth)acrylic monomer is an acrylic monomer having a hydroxyl group. The hydroxyl group containing (meth)acrylic monomer may include, e.g., 2-hydroxyethyl (meth)acrylate, 4-hydroxybutyl(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxypropyl(meth) acrylate, 2-hydroxybutyl(meth)acrylate, 2-hydroxy-3-phenyloxypropyl(meth)acrylate, 4-hydroxycyclohexyl(meth) acrylate, N-2-hydroxyethyl(meth)acrylamide, and cyclohexane dimethanol monoacrylate. Further, the hydroxyl group containing (meth)acrylic monomer may include compounds obtained by addition reaction of a glycidyl group containing compound, such as alkyl glycidyl ether, allyl glycidyl ether, and glycidyl(meth)acrylate, with (meth)acrylic acid. These hydroxyl group containing (meth)acrylic monomers may be used alone or as mixtures. Among these monomers, 2-hydroxyethyl(meth)acrylate, 4-hydroxybutyl(meth) acrylate, N-2-hydroxyethyl(meth)acrylamide, and cyclohexane dimethanol monoacrylate are preferable; and 2-hydroxyethyl(meth)acrylate, 4-hydroxybutyl(meth)acrylate, and N-2-hydroxyethyl(meth)acrylamide are more preferable.

In the present example embodiment, the hydroxyl group containing (meth)acrylic monomer may be present in an amount of 0 to 1.8 parts by weight, preferably 0.1 to 1.5 parts by weight, and more preferably 0.1 to 1.4 parts by weight. Maintaining the amount at or below 1.8 parts by weight helps ensure that an undue number of hydroxyl groups are not present in the copolymer (A), which could result in too many crosslink points being formed by reaction of these hydroxyl groups and the carbodiimide cross-linking agent (B), thus resulting in reduced flexibility and reduced light leakage resistance and durability.

(a-3) (Meth)Acrylic Acid Ester Monomer

In the present example embodiment, the (meth)acrylic acid ester monomer is an ester of (meth)acrylic acid having no hydroxyl group. The (meth)acrylic acid ester monomer may include, e.g., methyl(meth)acrylate, ethyl(meth)acrylate, propyl(meth)acrylate, isopropyl(meth)acrylate, n-butyl (meth)acrylate, isobutyl(meth)acrylate, tert-butyl(meth) acrylate, isoamyl(meth)acrylate, n-hexyl(meth)acrylate, n-heptyl(meth)acrylate, n-octyl(meth)acrylate, tert-octyl (meth)acrylate, 2-ethylhexyl(meth)acrylate, decyl(meth) acrylate, isodecyl(meth)acrylate, tridecyl(meth)acrylate, stearyl(meth)acrylate, isostearyl(meth)acrylate, phenyl (meth)acrylate, benzyl(meth)acrylate, dodecyl(meth)acrylate, tetrahydrofurfuryl(meth)acrylate, cyclohexyl(meth) acrylate, 4-n-butylcyclohexyl(meth)acrylate, 2-ethylhexyl diglycol(meth)acrylate, butoxyethyl(meth)acrylate, butoxymethyl(meth)acrylate, 3-methoxybutyl(meth)acrylate, 2-(2-methoxyethoxy)ethyl(meth)acrylate, 2-(2-butoxyethoxy)ethyl(meth)acrylate, 4-butylphenyl(meth)acrylate, phenyl(meth)acrylate, 2,4,5-tetramethyl phenyl(meth)acrylate, phenoxymethyl(meth)acrylate, phenoxyethyl(meth) acrylate, polyethylene oxide monoalkyl ether(meth)acrylate, polyethylene oxide monoalkyl ether(meth)acrylate, polypropylene oxide monoalkyl ether(meth)acrylate, trifluoroethyl (meth)acrylate, pentadecafluorooxyethyl(meth)acrylate, 2-chloroethyl(meth)acrylate, 2,3-dibromopropyl(meth)acrylate, and tribromophenyl(meth)acrylate. These (meth)acrylic acid ester monomers may be used alone or as mixtures. Among these monomers, methyl(meth)acrylate (e.g., methyl acrylate), ethyl acrylate, n-butyl(meth)acrylate, and 2-ethylhexyl(meth)acrylate are preferable; and methyl(meth)acrylate, n-butyl(meth)acrylate, and 2-ethylhexyl(meth)acrylate are more preferable.

In the present example embodiment, the (meth)acrylic acid ester monomer may be present in an amount of 89.2 to 99.9 parts by weight, preferably 90.5 to 99.8 parts by weight, and more preferably 93.6 to 99.7.

The (meth)acrylate copolymer (A) may be prepared by any suitable method, e.g., solution polymerization, emulsion polymerization, suspension polymerization, reverse-phase suspension polymerization, thin-film polymerization, and spray polymerization, which use a polymerization initiator. Polymerization control may be conducted by thermal insulation polymerization, temperature control polymerization, and isothermal polymerization. In addition to a method of using a polymerization initiator to initiate polymerization, irradiation, electromagnetic radiation, and UV radiation may be used to initiate polymerization. Among these methods, solution polymerization using a polymerization initiator may be used so that molecular weight is easily adjusted and impurities may be decreased. For example, the (meth)acrylate copolymer may be produced by adding 0.01 to 0.5 parts by weight of a polymerization initiator to 100 parts by weight of the total amount of the monomers using, e.g., ethyl acetate, toluene, or methyl ethyl ketone as a solvent, followed by reaction under a nitrogen atmosphere at 60 to 90° C. for 3 to 10 hours. The polymerization initiator may include, e.g., azo compounds, such as azobisisobutyronitrile (AIBN), 2-2'-azobis(2-methylbutyronitrile), and azobiscyanovaleric acid; organic peroxides, such as tert-butyl peroxypivalate, tert-butyl peroxybenzoate, tert-butyl peroxy-2-ethylhexanoate, di-tert-butyl peroxide, cumene hydroperoxide, benzoyl peroxide, and tert-butyl hydroperoxide; and inorganic peroxides, such as hydrogen peroxide, ammonium persulfate, potassium persulfate, and sodium persulfate. These initiators may be used alone or as mixtures.

In an implementation, the copolymer may further include monomers other than the monomers (a-1) to (a-3), i.e., other monomers copolymerizable with the monomers (a-1) to (a-3). The other monomers may include, e.g., an epoxy group containing acrylic monomer, such as glycidyl(meth)acrylate and methyl glycidyl(meth)acrylate; an amino group containing acrylic monomer, such as dimethylaminoethyl(meth)acrylate, diethylaminoethyl(meth)acrylate, N-tert-butylaminoethyl(meth)acrylate, and methacryloxyethyl trimethylammonium chloride(meth)acrylate; an amide group containing acrylic monomer, such as (meth)acrylamide, N-methylol(meth)acrylamide, N-methoxymethyl(meth)acrylamide, and N,N-methylene bis(meth)acrylamide; a phosphate group containing acrylic monomer, such as 2-methacryloyloxyethyl diphenyl phosphate(meth)acrylate, trimethacryloyloxyethyl phosphate (meth)acrylate, and triacryloyloxyethyl phosphate(meth)acrylate; a sulfonic acid group containing acrylic monomer, such as sodium sulfopropyl(meth)acrylate, sodium-2-sulfoethyl (meth)acrylate, and sodium-2-acrylamid-2-methylpropane sulfonate; a urethane group containing acrylic monomer, such as urethane (meth)acrylate; a phenyl group containing acrylic vinyl monomer, such as p-tert-butylphenyl(meth)acrylate and o-biphenyl (meth)acrylate; a silane group containing vinyl monomer, such as vinyltrimethoxysilane, vinyltriethoxysilane, vinyl tris (β-methoxyethyl)silane, vinyl triacetylsilane, and methacryloyloxypropyltrimethoxysilane; styrene; chlorostyrene; α-methylstyrene; vinyltoluene; vinyl chloride; vinyl acetate; vinyl propionate; acrylonitrile; vinyl pyridine; etc. These monomers may be used alone or as mixtures. Among these monomers, (meth)acrylamide, glycidyl(meth)acrylate, and dimethylaminoethyl(meth)acrylate are preferable; and (meth)acrylamide and dimethylaminoethyl(meth)acrylate are more preferable. The other monomers may be present in an amount of 0.1 to 10 parts by weight, preferably 0.2 to 5 parts by weight, and more preferably 0.3 to 2 parts by weight, based on 100 parts by weight of the total amount of the monomers (a-1) to (a-3).

The (meth)acrylate copolymer (A) prepared by copolymerization of the above monomers may have a weight average molecular weight Mw of 1,000,000 to 2,000,000 g/mol, preferably 1,100,000 to 1,800,000 g/mol, and more preferably 1,200,000 to 1,700,000 g/mol. Maintaining the weight average molecular weight at or above 1,000,000 g/mol helps ensure that sufficient heat resistance is obtained. Maintaining the weight average molecular weight at or below 2,000,000 g/mol helps ensure that sufficient adhesion is obtained, thereby maintaining adhesiveness. Herein, the weight average molecular weight is based on a polystyrene standard measured by the method stated in the following examples.

In an embodiment, the total amount of the monomer (a-1) and the monomer (a-2) is greater than 0 parts by weight, i.e., the (meth)acrylate copolymer (A) includes at least one of: a unit component derived from the monomer (a-1) and a unit component derived from the monomer (a-2). In an implementation, the total amount of the components (a-1), (a-2), and (a-3) is 100 parts by weight.

The copolymer (A) may be used alone or as a mixture of at least two polymers.

(B) Carbodiimide Cross-linking Agent

In the present example embodiment, the adhesive composition may include a carbodiimide cross-linking agent (hereinafter, also referred to as "component (B)") in addition to the component (A). The carbodiimide cross-linking agent reacts with and is coupled to a hydroxyl group and/or a carboxyl group of the (meth)acrylate copolymer (A), thereby forming a cross-linking structure.

The carbodiimide cross-linking agent (B) may include any suitable carbodiimide cross-linking agent. For example, a compound having at least two carbodiimide groups (—N═C═N—) may be used, and any suitable polycarbodiimide may be used.

In an implementation, the carbodiimide compound may include a high molecular weight polycarbodiimide prepared by decarbonation condensation reaction of diisocyanate in the presence of a carbodiimide catalyst. Examples of the compound may include compounds obtained by decarbonation condensation reaction of the following diisocyanates. The diisocyanates include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethyl xylene diisocyanate, which may be used alone or as mixtures.

The carbodiimide catalyst may include phospholene oxides, such as 1-phenyl-2-phospholene-1-oxide, 3-methyl-2-phospholene-1-oxide, 1-ethyl-3-methyl-2-phospholene-1-oxide, 1-ethyl-2-phospholene-1-oxide, 3-phospholene, and isomers thereof.

In addition, these high-molecular weight polycarbodiimides may be synthesized or a commercially available product may be used. Commercially available products of the component (B) may include CARBODILITE® (Nisshinbo Chemical Inc.), specifically CARBODILITE V-01, V-03, V-05, V-07 and V09, which have excellent compatibility with organic solvents.

In the present example embodiment, the carbodiimide cross-linking agent (B) may be present in an amount of 0.05 to 5 parts by weight based on 100 parts by weight of the (meth)acrylate copolymer (A). Within this range, a suitable cross-linking structure may be formed, realizing excellent heat resistance. Maintaining the amount of the carbodiimide cross-linking agent (B) at or above 0.05 parts by weight helps ensure that sufficient cross-linking structure is formed, thereby providing heat resistance. Maintaining the amount at or below 5 parts by weight helps ensure that the cross-linking reaction is not excessively performed, which could decrease adhesion and deteriorate the ability to accommodate contraction of a polarizer plate over time, resulting in decrease in light leakage resistance and durability. In the present example embodiment, the amount may be 0 to 4 parts by weight, preferably 0.1 to 3 parts by weight.

(C) Isocyanate Cross-linking Agent

In an embodiment, the adhesive composition may include an isocyanate cross-linking agent (C) (hereinafter, also referred to as "component (C)") in addition to the components (A) and (B). When the isocyanate cross-linking agent (C) is added, an adhesive layer formed using the adhesive composition may provide for further improved light leakage resistance and durability.

The isocyanate cross-linking agent (C) may include, e.g., aromatic diisocyanates, such as triallyl isocyanate, dimeric acid diisocyanate, 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), toluydine diisocyanate (TODI), and 1,5-naphthalene diisocyanate (NDI); aliphatic diisocyanates, such as hexamethylene diisocyanate (HDI), trimethylhexamethylene diisocyanate (TM-HDI), lysine diisocyanate, and norbornane diisocyanate (NBDI); alicyclic isocyanates, such as trans-cyclohexane-1, 4-diisocyanate, isophorone diisocyanate (IPDI), H6-XDI (hydrogen added XDI), and H12-MDI (hydrogen added MDI); carbodiimide-modified diisocyanates of the foregoing diisocyanates; or isocyanurate-modified diisocyanates thereof. In addition, adducts of the foregoing isocyanate compounds and polyol compounds, such as trimethylolpropane, or biurets and isocyanurates of the isocyanate compounds may be suitable used.

The component (C) may be synthesized or a commercially available product may be used. Commercially available products for the component (C) may include Colonate L, Colonate HL, Colonate 2030, Colonate 2031 (registered trade names, Nippon Polyurethane Industry Co., Ltd.), Takenate D-102, Takenate D-110N, Takenate D-200, Takenate D-202 (registered trade names, Mitsui Chemicals Inc.), Duranate 24A-100, Duranate TPA-100, Duranate TKA-100, Duranate P301-75E, Duranate E402-90T, Duranate E405-80T, Duranate TSE-100, Duranate D-101, and Duranate D-201 (trade names, Asahi Kasei Corporation). Among these, Colonate L, Colonate HL, Takenate D-110N, and Duranate 24A-100 are preferable; Colonate L and Takenate D-110N are more preferable; and Colonate L is even more preferable. These crosslinking agents may be used alone or as mixtures.

When the component (C) is used, the amount of the component (C) may be 0.05 to 5 parts by weight based on 100 parts by weight of the component (A). Within this range, the adhesive composition may provide for excellent light leakage resistance and durability. The amount may be 0.1 to 4 parts by weight, preferably 0.15 to 3 parts by weight.

In addition to the above components, the adhesive composition according to an embodiment may further include a silane coupling agent. When the silane coupling agent is used, reactivity may be improved and a cross-linked product may have improved mechanical strength and adhesion. The silane coupling agent may include, e.g., methyltrimethoxysilane, dimethyldimethoxysilane, trimethylmethoxysilane, n-propyltrimethoxysilane, ethyltrimethoxysilane, diethyldiethoxysilane, n-butyltrimethoxysilane, n-hexyltriethoxysilane, n-octyltrimethoxysilane, phenyltrimethoxysilane, diphenyldimethoxysilane, cyclohexylmethyldimethoxysilane, vinyltrichlorosilane, vinyltrimethoxysilane, vinyltriethoxysilane, vinyl tris($\beta$-methoxyethoxy)silane, $\beta$-(3,4-epoxycyclohexyl)ethyltrimethoxysilane, $\gamma$-glycidoxypropyltrimethoxysilane, $\gamma$-glycidoxypropyltriethoxysilane, $\gamma$-methacryloxypropylmethyldimethoxysilane, $\gamma$-methacryloxypropyltrimethoxysilane, $\gamma$-methacryloxypropylmethyldiethoxysilane, $\gamma$-methacryloxypropyltriethoxysilane, $\gamma$-acryloxypropyltrimethoxysilane, N-$\beta$-(aminoethyl)-$\gamma$-aminopropylmethyldimethoxysilane, N-$\beta$-(aminoethyl)-$\gamma$-aminopropyltrimethoxysilane, N-$\beta$-(aminoethyl)-$\gamma$-aminopropyltriethoxysilane, $\gamma$-aminopropyltrimethoxysilane, $\gamma$-aminopropyltriethoxysilane, N-phenyl-$\gamma$-aminopropyltrimethoxysilane, $\gamma$-chloropropyltrimethoxysilane, $\gamma$-mercaptopropyltrimethoxysilane, $\gamma$-mercaptopropylmethyldimethoxysilane, bis[3-(triethoxysilyl)propyl]tetrasulfide, and $\gamma$-isocyanatopropyltriethoxysilane. Further, a compound having a hydrolytic silyl group which is obtained by reaction of a silane coupling agent having a functional group (e.g., an epoxy group (glycidoxy group), amino group, mercapto group, and (meth)acryloyl group), a silane coupling agent having a functional group reactive to the foregoing functional groups, other coupling agents, and polyisocyanate at a certain ratio with respect to each functional group may be used.

The silane coupling agent may be synthesized or a commercially available product may be used. Commercially available silane coupling agents may include KBM-303, KBM-403, KBE-402, KBE-403, KBE-502, KBE-503, KBM-5103, KBM-573, KBM-802, KBM-803, KBE-846, and KBE-9007 (Shin-etsu Chemical Co., Ltd.). Among these, KBM-303, KBM-403, KBE-402, KBE-403, KBM-5103, KBM-573, KBM-802, KBM-803, KBE-846, and KBE-9007 are preferable; KBM 403 is more preferable. These silane coupling agents may be used alone or as mixtures.

The amount of the silane coupling agent may be 0 to 1 parts by weight, preferably 0 to 0.5 parts by weight, and more preferably 0 to 0.1 parts by weight based on 100 parts by weight of the total amount of the components (A) to (C). Within this range, excellent heat resistance and adhesiveness may be obtained. Maintaining the amount of the silane coupling agent at or below 1 part by weight helps ensure a desirable amount of heat resistance.

In addition to, or instead of, the silane coupling agent, the adhesive composition may further include additives, such as a curing accelerator, an ionic liquid, a lithium salt, an inorganic filler, a softener, an antioxidant, an anti-aging agent, a stabilizer, a tackifier resin, a reforming resin (polyol resin, phenolic resin, acrylic resin, polyester resin, polyolefin resin, epoxy resin, epoxylated polybutadiene resin, etc.), a leveling agent, an antifoaming agent, a plasticizer, a dye, a pigment (coloring and extender pigments), a treatment agent, a UV blocking agent, a fluorescent whitening agent, a dispersant, a heat stabilizer, a light stabilizer, a UV absorber, an anti-static agent, a lubricant, and a solvent. Among these, the curing accelerator may include, e.g., dibutyltin dilaurate, JCS-50 (Johoku Chemical Company Ltd.), and Formate TK-1 (Mitsui Chemicals Inc.). The ionic liquid may include, e.g., materials having cations, such as phosphonium, pyridinium, pyrrolidinium, imidazolium, guanidinium, ammonium, isouronium, thiouronium, piperidium, pyrazolium, and sulfonium ions, and materials having anions, such as halide, nitrate, sulfate, phosphate, perchlorate, thiocyanate, thiosulfate, sulfite, tetrafluoroborate, hexafluorophosphate, formate, oxalate, acetate, trifluoroacetate, and alkyl sulfonate ions. The antioxidant may include, e.g., dibutylhydroxytoluene (BHT), Irganox 1010, Irganox 1035FF, and Irganox 565 (registered trade names, Chiba Specialty Chemicals Co., Ltd.). The tackifier resin may include, e.g., rosins, such as rosin acid, polymerized rosin acid, and rosin acid ester, a terpene resin, a terpene phenolic resin, an aromatic hydrocarbon resin, an aliphatic saturated hydrocarbon resin, and a petroleum resin. When these additives are used, the amount of the additives may be, e.g., 0.1 to 20 parts by weight based on 100 parts by weight of the total amount of the components (A) to (B), or (A) to (C) when (C) is included.

The adhesive composition may be prepared by mixing the above components at once or in order, or mixing some components first and then adding the remaining components, and stirring the components into a uniform mixture. For example, preparation may be conducted by heating at 30 to 40° C., if desired, and stirring using a stirrer for 10 minutes to 5 hours until the mixture is uniform.

The adhesive composition may be used to bond various materials, for example glass, plastic films, paper, metal foil, or the like. The glass may include general inorganic glass. Plastics of the plastic films may include polyvinyl chloride resin, polyvinylidene chloride, cellulose resin, acrylic resin, cycloolefin resins, amorphous polyolefin resins, polyethylene, polypropylene, polystyrene, ABS resin, polyamide, polyester, polycarbonate, polyurethane, polyvinyl alcohol, an ethylene-vinyl acetate copolymer, and chlorinated polypropylene. The amorphous polyolefin resins may include a polymer unit of a cyclic polyolefin, such as norbornene or multiple-ring norbornene monomers, and may be a copolymer of cyclic olefin and a chain-cyclic olefin. Commercially available products of amorphous polyolefin resins include ATON (trade name, JSR Co.), ZEONEX and ZEONR (registered trade names, Nihon Zeon Co.), APO (Mitsui Chemicals Inc.), APEL (registered trade name), etc. The amorphous polyolefin resins may be formed into a film by a suitable method, such as solvent casting and melt extrusion. Further, examples of paper may include vellum paper, wood free paper, kraft paper, art coat paper, caster coat paper, bowl paper, artificial parchment, waterproof paper, glassine paper, and linerboard. Examples of metal foil may include aluminum foil.

Another embodiment provides an optical member including an adhesive layer formed of the adhesive composition according to an embodiment.

The optical member may include, or may be, e.g., a polarizer plate, a phase difference plate, an optical film for PDPs, a conductive film for touch panels, or the like. Among these optical members, the adhesive composition according to an embodiment may provide excellent adhesiveness to a polarizer plate and glass, although the adhesive composition may also be used to bond other materials.

The adhesive composition according to an embodiment may be applied directly to one or opposite sides of an optical member, thereby forming an adhesive layer. In another implementation, an adhesive layer, formed in advance by depositing the adhesive composition on a release film, may be transferred to one or opposite sides of an optical member.

The adhesive composition may be applied by any suitable method, e.g., various methods using a natural coater, a knife belt coater, a floating knife, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator and a gravure coater. Although adjusted based on materials and purposes, the thickness of the applied adhesive composition (thickness after drying) may be, e.g., 5 to 30 μm, preferably 15 to 25 μm.

The adhesive composition may have a viscosity of, e.g., 500 to 5,000 mPa·s at 25° C., more preferably 1,000 to 3,000 mPa·s in order to facilitate application and control of the thickness of the adhesive layer.

An adhesive layer obtained from the adhesive composition according to an embodiment may be formed by cross-linking the adhesive composition. Cross-linking of the adhesive composition may generally be performed after applying the adhesive composition. However, an adhesive layer formed of the cross-linked adhesive composition may be transferred to a substrate. The adhesive composition may be cross-linked at, e.g., 20 to 40° C., 30 to 70% RH (relative humidity), and normal (atmospheric) pressure.

The adhesive composition according to an embodiment may be used for, e.g., a polarizer plate, and may exhibit excellent flexibility and accommodate contraction of the polarizer plate over time, thus providing for superior light leakage resistance. Further, the adhesive composition may exhibit excellent durability, such that an adhesive layer formed therefrom suffers little or no damage or separation as a result of elevated temperatures or humidity.

EXAMPLES

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

The solid content and viscosity of polymer solutions obtained in Preparation Examples and the weight average molecular weight of polymers (A) are measured by the following process.

<Solid Content>

About 1 g of a polymer solution was precisely measured on a precisely weighed glass plate. The solution was dried at 105° C. for 1 hour and cooled to room temperature, and then the total mass of the glass plate and the remaining solid content was precisely measured. Defining the mass of the glass plate as X, the total mass of the glass plate and the polymer solution before drying as Y, and the total mass of the glass plate and the remaining solid content as Z, a solid content was calculated by Equation 1.

Solid content (%)={(Z−X)/(Y−X)}×100  [Equation 1]

<Viscosity>

The temperature of a polymer solution in a glass bottle was adjusted to 25° C. and then the viscosity was measured using a B-type viscometer.

<Weight Average Molecular Weight>

The weight average molecular weight was measured by the following method under the following condition illustrated in Table 1.

TABLE 1

| Equipment | Gel Permeation Chromatography (GPC, Device No. GPC-16) |
|---|---|
| Detector | Differential Refractive Index Detector (RI-8020, Sensitivity: 32, Tosoh Corporation) |
|  | UV Absorbance Detector (2487, Wavelength: 215 nm, Sensitivity: 0.2 AUFS, Waters) |
| Column | Two TSKgel GMHXL, One G2500HXL (S/N M0052, M0051, N0010, ϕ7.8 mm × 30 cm, Tosoh Corporation) |
| Solvent | Tetrahydrofuran (Wako Junyaku Co., Ltd.) |
| Flow rate | 1.0 ml/min |
| Column temperature | 23° C. |
| Sample | Concentration: About 0.2% |
|  | Dissolving: Smoothly stirred at room temperature |
|  | Solubility: Dissolved (identified with the naked eye) |
|  | Filtration: Filtered through a 0.45 μm filter |
| Input | 0.200 ml |
| Reference sample | Monodispersed polystyrene |
| Data processing | GPC data processing system |

Preparation Example 1

For Preparation Example 1, 99 parts by weight of n-butyl acrylate (Nihon Shokubai, Co., Ltd.), 1 part by weight of 2-hydroxyethyl acrylate (Nihon Shokubai, Co., Ltd.), and 120 parts by weight of ethyl acetate were placed in a flask equipped with a reflux condenser and an agitator, and were heated to 65° C. under a nitrogen atmosphere. 0.04 parts by weight of azobisisobutyronitrile (AIBN) was added, followed by polymerization for 6 hours while maintaining the mixture at 65° C. After completing the polymerization, the mixture was diluted with 280 parts by weight of ethyl acetate, thereby obtaining a solution of a polymer (A-1). The solution of the polymer (A-1) had a solid content of 20% and a viscosity of 4,500 mPa·s. Further, the polymer (A-1) had a weight average molecular weight of 1,600,000.

Preparation Examples 2 to 18

For Preparation Examples 2 to 18, solutions of polymers (A-2) to (A-18) were prepared by the same process as in Preparation Example 1, except that the monomers were mixed according to the compositions listed in Table 2. Then, the solid content and viscosity of the solutions of the polymers (A-2) to (A-18) and the weight average molecular weight of the polymers (A-2) to (A-18) were measured. Results are shown in Table 2 of FIG. 1. In Table 2, "BA," "2EHA," "HEA," "4HBA," "HEAA," and "AA" refer to butyl acrylate, 2-ethylhexyl acrylate, 2-hydroxyethyl acrylate, 4-hydroxybutyl acrylate, N-2-hydroxyethyl acrylamide, and acrylic acid, respectively.

Example 1

For Example 1, 500 parts by weight of the solution of the polymer (A-1) (100 parts by weight of the solid polymer) obtained in Preparation Example 1, 1 part by weight of CARBODILITE V-01 (B-1, registered trade name, Nisshinbo Chemical Inc.) as a carbodiimide cross-linking agent (B), 0.2 parts by weight of Colonate L (C-1, trimethylolpropane/tolylene diisocyanate trimer adduct, registered trade name, Nippon Polyurethane Industry Co., Ltd.) as an isocyanate cross-linking agent (C), and 0.1 parts by weight of KBM-403 (3-glycidoxypropylmethyldiethoxysilane, Shin-etsu Chemical Co., Ltd.) as a silane coupling agent were mixed at room temperature (25° C.) for 10 minutes, thereby producing an adhesive composition solution.

The solution was applied to a PET release film (MRF38, thickness: 38 µm, Mitsubishi Polyester Film Inc.) to a dry thickness of 25 µm and dried at 90° C. for 3 minutes, thereby forming an adhesive layer. Then, the adhesive layer was attached to a polarizer plate, thereby producing an adhesive layer-attached polarizer plate.

Examples 2 to 10 and Comparative Examples 1 to 8

For Examples 2 to 10 and Comparative Examples 1 to 8, the same process as in Example 1 was performed, except that the polymers obtained in Preparation Examples 2 to 18, the carbodiimide cross-linking agent, the isocyanate cross-linking agent, an additional cross-linking agent other than the carbodiimide cross-linking agent and the isocyanate cross-linking agent, and the silane coupling agent were used according to the compositions listed in Table 4, thereby preparing adhesive composition solutions and then producing adhesive layer-attached polarizer plates. Details of the carbodiimide cross-linking agents B-2 and B-3 and the additional cross-linking agent are illustrated in Table 3.

TABLE 3

| Carbodiimide cross-linking agents (B) | |
|---|---|
| B-2 | CARBODILITE V-05 (registered trade name, Nisshinbo Chemical Inc) |
| B-3 | CARBODILITE V-09 (registered trade name, Nisshinbo Chemical Inc) |
| Additional cross-linking agent | |
| D-1 | TETRAD X (N,N,N',N'-tetraglycidyl-m-xylenediamine, Mitsubishi Gas Chemical Company, Inc.) |

The properties of the adhesive layer-attached polarizer plates according to Examples 1 to 10 and Comparative Examples 1 to 8 were evaluated as follows.
1. Metal Corrosion Control and Prevention Properties
The adhesive layer side of each polarizer plate, left at 23° C. and 50% RH for 7 days, was attached to aluminum foil and left at 60° C. and 90% RH for 2 days, followed by observation of corrosion. In Table 4, no change is represented by "O" and whitening is represented by "X."
2. Light Leakage Resistance
Each polarizer plate having an adhesive layer, left at 23° C. and 50% RH for 7 days, was cut into a 120 mm (machine direction (MD direction) of the polarizer plate)×60 mm piece and a 120 mm (transverse direction (TD direction) of the polarizer plate)×60 mm piece. The respective pieces were attached to opposite sides of a glass substrate, overlapping with each other, and autoclaved at 50° C. and 0.49 MPa (5 kg/cm²) for 20 minutes. Then, the glass substrate was left at 80° C. for 120 hours and 500 hours, followed by observation of appearance. In Table 4, no light leakage after 120 hours and 500 hours is represented by "Δ," no light leakage after 120 hours is represented by "O," and light leakage is represented by "X."
3. Durability
Each polarizer plate having an adhesive layer, left at 23° C. and 50% RH for 7 days, was cut into a 120 mm (MD direction of the polarizer plate)×60 mm piece. The piece was attached to a glass substrate and autoclaved at 50° C. and 0.49 MPa (5 kg/cm²) for 20 minutes. Then, the glass substrate was left at 100 or 80° C. and 90% RH for 120 hours, followed by observation of appearance. In Table 4, no occurrence of bubbles, damage, and release is represented by "O," while occurrence of bubbles, damage, and release is represented by "X."
4. Adhesion
Each polarizer plate having an adhesive layer, left at 23° C. and 50% RH for 7 days, was cut into 25 mm wide pieces. The pieces were attached to a glass substrate and autoclaved at 50° C. and 0.49 MPa (5 kg/cm²) for 20 minutes. The adhesion of the adhesive layer was measured according to a testing method of pressure sensitive adhesive tapes and sheets disclosed in JIS Z0237, 2000, using a tensile tester at a stripping angle of 90° and a stripping rate of 0.3 m/min under 23° C./50% RH conditions.
5. Adhesiveness to Substrate
While measuring the adhesion, the adhesiveness was evaluated. In Table 4, the adhesive layer not separated from the substrate is represented by "O," while the adhesive layer separated from the substrate is represented by "X."
6. Adherend Contamination Resistance
The contact angle of the glass substrate was measured before and after measurement of the adhesion. In Table 4, no change in the contact angle of the glass substrate before and after measurement of the adhesion us represented by "O," while change in the contact angle of the glass substrate before and after measurement of the adhesion is represented by "X."
7. Low-temperature Stability
Each polarizer plate having an adhesive layer, left at 23° C. and 50% RH for 7 days, was cut into a 120 mm (MD direction of the polarizer plate)×60 mm piece. The piece was attached to a glass substrate and autoclaved at 50° C. and 0.49 MPa (5 kg/cm²) for 20 minutes. Then, the glass substrate was left at −40° C. for 120 hours, followed by observation of appearance. In Table 4, no occurrence of bubbles, damage, release, or recrystallized materials is represented by "O," while occurrence of bubbles, damage, release, or recrystallized materials is represented by "X."
8. Reworkability
While measuring the adhesion, a separated state was observed. In Table 4, appearance of interface failure is represented by "O," while appearance of an adhesion and/or cohesion failure of the adhesive to the glass substrate (adherend) is represented by "X."

9. Gel Content

In Examples 1 to 10 and Comparative examples 1 to 8, the adhesive layer was formed on a stripped polyester film instead of a polarizer plate, followed by measurement of gel content (%) after 7 days. In measurement of the gel content, about 0.1 g of the adhesive composition, left at 23° C. and 50% RH, was taken and defined as $W_1(g)$. This composition was placed in a sample bottle, and about 30 g of ethyl acetate was added and left for 24 hours. After a predetermined time, the contents of the bottle were filtered through a 200-mesh stainless steel mesh (weight: $W_2(g)$). The mesh and the remaining materials were dried at 90° C. for 1 hour, and the total weight $W_3(g)$ was measured. The gel content (%) was calculated using the measured values and Equation 2.

$$\text{Gel content (\%)} = \{(W_3 - W_2)/W_1\} \times 100 \quad \text{[Equation 2]}$$

Results of each evaluation are shown in Table 4 of FIG. 2. In Table 4, properties of the adhesive layer according to Comparative Example 5 were not evaluated since gelation was involved in preparing the adhesive layer.

As shown in Table 4, the polarizer plates using the adhesive compositions according to Examples 1 to 10 provide for excellent light leakage resistance and durability as compared with the polarizer plates using the adhesive compositions according to Comparative Examples 1 to 8. In particular, the adhesive layers obtained from the adhesive compositions including the isocyanate cross-linking agent (C) according to Examples 1, 2, 3, 5, 6, 8, and 10 provided for enhanced light leakage resistance.

By way of summation and review, there is a demand for improvement in durability of pressure-sensitive adhesives applied to a FPD. Further, when pressure-sensitive adhesives are used for an LCD, it is important to avoid light leakage due to contraction of a polarizer plate.

As described above, embodiments relate to an adhesive composition having excellent heat resistance and flexibility, and an optical member using the same. The adhesive composition may be used to form an adhesive layer having excellent light leakage resistance and durability. An adhesive composition according to an embodiment may include a (meth) acrylate copolymer and a carbodiimide cross-linking agent at a particular composition, and may provide for excellent light leakage resistance and durability. An adhesive layer formed of the adhesive composition may provide flexibility, thus accommodating contraction of a polarizer plate over time, thereby providing for excellent light leakage resistance. Further, the adhesive composition may have excellent durability. Thus, the adhesive layer may be hardly stripped or separated from an adherend by heat or humidity.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An adhesive composition, comprising:
   100 parts by weight of a (meth)acrylate copolymer having a weight average molecular weight of 1,000,000 to 2,000,000 g/mol;
   0.05 to 5 parts by weight of a carbodiimide cross-linking agent;
   0.05 to 5 parts by weight of an isocyanate cross-linking agent; and
   greater than 0 to 1 parts by weight of a silane coupling agent,
   wherein:
   the adhesive composition has an adhesive strength of 4 N/25 mm to 7 N/25 mm,
   the adhesive composition has a gel content of 77 to 93%, and
   further wherein said (meth)acrylate copolymer comprises:
   0 to 9 parts by weight of a carboxyl group containing monomer;
   0.1 to 1.8 parts by weight of a hydroxyl group containing (meth)acrylic monomer, and
   89.2 to 99.9 parts by weight of a (meth)acrylic acid ester monomer, the (meth)acrylic acid ester monomer including at least one of methyl (meth)acrylate, ethyl (meth)acrylate, propyl (meth)acrylate, isopropyl (meth)acrylate, n butyl (meth)acrylate, isobutyl (meth)acrylate, tert butyl (meth)acrylate, isoamyl (meth)acrylate, n hexyl (meth)acrylate, n heptyl (meth)acrylate, n octyl (meth)acrylate, tert octyl (meth)acrylate, 2 ethylhexyl (meth)acrylate, decyl (meth)acrylate, isodecyl (meth)acrylate, tridecyl (meth)acrylate, stearyl (meth)acrylate, isostearyl (meth)acrylate and dodecyl (meth)acrylate.

2. The adhesive composition as claimed in claim 1, wherein said (meth)acrylate copolymer further comprises at least one of an epoxy group containing acrylic monomer, an amino group containing acrylic monomer, a phosphate group containing acrylic monomer, a sulfonic acid group containing acrylic monomer, a urethane group containing acrylic monomer, a phenyl group containing acrylic vinyl monomer, a silane group containing vinyl monomer, styrene, chlorostyrene, α-methylstyrene, vinyltoluene, vinyl chloride, vinyl acetate, vinyl propionate, acrylonitrile, and vinyl pyridine.

3. The adhesive composition as claimed in claim 1, wherein said adhesive composition has a viscosity of 500 to 5,000 mPa·s at 25° C.

4. An optical member comprising an adhesive layer formed of the adhesive composition as claimed in claim 1.

5. The adhesive composition as claimed in claim 1, wherein the carbodiimide cross-linking agent includes at least one compound obtained by decarbonation condensation reaction of one or more of 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethyl xylene diisocyanate.

6. The adhesive composition as claimed in claim 5, wherein the isocyanate cross-linking agent includes a diisocyanate compound.

7. The adhesive composition as claimed in claim 1, wherein the adhesive composition includes 0.1 to 3 parts by weight of the carbodiimide cross-linking agent.

8. The adhesive composition as claimed in claim 7, wherein the adhesive composition includes 0.15 to 3 parts by weight of the isocyanate cross-linking agent.

9. The adhesive composition as claimed in claim 1, wherein a total amount of the carbodiimide and the isocyanate cross-linking agents in the adhesive composition is no greater than 4.3 parts by weight.

10. The adhesive composition as claimed in claim 9, wherein the total amount of the carbodiimide and the isocyanate cross-linking agents is from 0.3 to 4.3 parts by weight.

11. The adhesive composition as claimed in claim 1, wherein the adhesive composition comprises:
  0.05 to 5 parts by weight of the carbodiimide cross-linking agent; and
  0.1 to 4 parts by weight of the isocyanate cross-linking agent.

12. An adhesive composition for adhering an optical member to a flat panel display, the adhesive composition comprising:
  100 parts by weight of a (meth)acrylate copolymer having a weight average molecular weight of 1,000,000 to 2,000,000 g/mol;
  0.05 to 5 parts by weight of a carbodiimide cross-linking agent;
  0.05 to 5 parts by weight of an isocyanate cross-linking agent; and
  a silane coupling agent, the silane coupling agent being present in an amount of greater than 0 to 1 part by weight,
wherein:
  the adhesive composition has an adhesive strength of 4 N/25 mm to 7 N/25 mm,
  the adhesive composition has a gel content of 77 to 93%, and further wherein said (meth)acrylate copolymer comprises:
  0 to 9 parts by weight of a carboxyl group containing monomer;
  0.1 to 1.8 parts by weight of a hydroxyl group containing (meth)acrylic monomer, and
  89.2 to 99.9 parts by weight of a (meth)acrylic acid ester monomer, the (meth)acrylic acid ester monomer including at least one of methyl (meth)acrylate, ethyl (meth)acrylate, propyl (meth)acrylate, isopropyl (meth)acrylate, n butyl (meth)acrylate, isobutyl (meth)acrylate, tert butyl (meth)acrylate, isoamyl (meth)acrylate, n hexyl (meth)acrylate, n heptyl (meth)acrylate, n octyl (meth)acrylate, tert octyl (meth)acrylate, 2 ethylhexyl (meth)acrylate, decyl (meth)acrylate, isodecyl (meth)acrylate, tridecyl (meth)acrylate, stearyl (meth)acrylate, isostearyl (meth)acrylate and dodecyl (meth)acrylate.

* * * * *